United States Patent
Okeya et al.

(10) Patent No.: US 11,472,476 B2
(45) Date of Patent: Oct. 18, 2022

(54) STEERING CONTROL DEVICE, STEERING CONTROL METHOD, AND RECORDING MEDIUM

(71) Applicant: ISUZU MOTORS LIMITED, Tokyo (JP)

(72) Inventors: Ryota Okeya, Fujisawa (JP); Takahiro Sato, Fujisawa (JP); Yuta Fujimaki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 162 days.

(21) Appl. No.: 16/759,957

(22) PCT Filed: Nov. 5, 2018

(86) PCT No.: PCT/JP2018/040948
§ 371 (c)(1),
(2) Date: Apr. 28, 2020

(87) PCT Pub. No.: WO2019/088278
PCT Pub. Date: May 9, 2019

(65) Prior Publication Data
US 2020/0324811 A1  Oct. 15, 2020

(30) Foreign Application Priority Data
Nov. 6, 2017 (JP) .............................. JP2017-213552

(51) Int. Cl.
*B62D 6/00* (2006.01)
*B60W 30/095* (2012.01)
(Continued)

(52) U.S. Cl.
CPC ............ *B62D 6/00* (2013.01); *B60W 30/095* (2013.01); *B60W 40/13* (2013.01); *G08G 1/167* (2013.01); *B60W 2040/1315* (2013.01)

(58) Field of Classification Search
CPC .......... B62D 6/00; B62D 15/025; B62D 6/04; B60W 30/095; B60W 40/13;
(Continued)

(56) References Cited

U.S. PATENT DOCUMENTS 10,118,614 B2 * 11/2018 Delp ................... G05D 1/0088
2009/0063002 A1  3/2009 Ono et al.
(Continued)

FOREIGN PATENT DOCUMENTS

CN   101400558 A   4/2009
CN   101778753 A   7/2010
(Continued)

OTHER PUBLICATIONS

International Search Report and Written Opinion for related PCT App No. PCT/JP2018/040948 dated Jan. 22, 2019, 11 pgs.
(Continued)

*Primary Examiner* — Jaime Figueroa
*Assistant Examiner* — Sihar A Karwan
(74) *Attorney, Agent, or Firm* — Procopio, Cory, Hargreaves & Savitch LLP

(57) ABSTRACT

A steering control device 10 is equipped with: a first specification unit 121 for specifying an expected travel position where a vehicle is expected to travel in the traffic lane in which the vehicle is travelling; a second specification unit 122 for specifying information about the weight of the vehicle; an adjustment unit 123 for adjusting the expected travel position in the vehicle-widthwise direction on the basis of the expected travel position of the vehicle and the weight information; and a steering control unit 124 for controlling steering on the basis of the adjusted expected travel position.

7 Claims, 4 Drawing Sheets

(51) Int. Cl.
*B60W 40/13* (2012.01)
*G08G 1/16* (2006.01)

(58) Field of Classification Search
CPC ..... B60W 2040/1315; B60W 2420/42; B60W 2520/10; B60W 2530/10; B60W 2540/18; B60W 2710/202; B60W 30/045; G08G 1/167
See application file for complete search history.

(56) References Cited

U.S. PATENT DOCUMENTS

| | | | |
|---|---|---|---|
| 2009/0088918 A1 | 4/2009 | Takenaka et al. | |
| 2010/0191421 A1 | 7/2010 | Nilsson | |
| 2011/0238251 A1* | 9/2011 | Wright | B60W 10/08 701/22 |
| 2011/0264302 A1* | 10/2011 | Tsunekawa | B60W 40/072 701/1 |
| 2011/0264328 A1 | 10/2011 | Brueggemann et al. | |
| 2013/0006473 A1* | 1/2013 | Buerkle | B62D 15/025 701/41 |
| 2013/0304322 A1* | 11/2013 | Isaji | B62D 6/00 701/41 |
| 2014/0032072 A1 | 1/2014 | Yoshihama | |
| 2014/0039772 A1* | 2/2014 | Jensen | B60K 23/0808 701/69 |
| 2015/0307095 A1 | 10/2015 | Aso | |
| 2015/0307125 A1 | 10/2015 | Kunihiro et al. | |
| 2016/0052547 A1* | 2/2016 | Kashiwai | B60W 30/18145 701/41 |
| 2016/0200317 A1* | 7/2016 | Danzl | B60W 10/04 701/25 |
| 2016/0264136 A1* | 9/2016 | Minoiu Enache | B60W 30/095 |
| 2016/0349755 A1* | 12/2016 | Kuwahara | B60W 10/184 |
| 2018/0099667 A1* | 4/2018 | Abe | G06V 20/588 |
| 2018/0188734 A1* | 7/2018 | Zhu | B62D 6/001 |
| 2019/0084579 A1* | 3/2019 | Maura | B60W 50/0098 |

FOREIGN PATENT DOCUMENTS

| | | |
|---|---|---|
| CN | 103459225 A | 12/2013 |
| CN | 104470792 A | 3/2015 |
| CN | 105015547 A | 11/2015 |
| DE | 19918597 A1 | 11/2000 |
| DE | 102010028109 A1 | 10/2011 |
| DE | 102014202230 A1 | 8/2015 |
| DE | 102015224389 A1 | 6/2017 |
| JP | 2001097072 A | 4/2001 |
| JP | 2002337714 A | 11/2002 |
| JP | 2010253978 A | 11/2010 |
| JP | 2011194973 A | 10/2011 |
| JP | 2012038238 A | 2/2012 |
| JP | 2013-164292 A | 8/2013 |
| JP | 2015209132 A | 11/2015 |
| WO | 2007018188 A1 | 2/2007 |

OTHER PUBLICATIONS

The State Intellectual Property Office of People's Republic of China, The First Office Action, Application No. CN201880070806.4, dated Nov. 29, 2021, in 23 pages.
German Patent and Trademark Office, Office Action, Application No. DE 11 2018 005 265.6, dated May 5, 2022, in 13 pages.

* cited by examiner

STEERING CONTROL DEVICE, STEERING CONTROL METHOD, AND RECORDING MEDIUM

CROSS-REFERENCE TO RELATED APPLICATIONS

This application is a U.S. National Stage entry of PCT Application No: PCT/JP2018/040948 filed Nov. 5, 2018, which claims priority to Japanese Patent Application No. 2017-213552 filed Nov. 6, 2017, the contents of which are incorporated herein by reference.

TECHNICAL FIELD

The present disclosure relates to a steering control device and a steering control method.

BACKGROUND ART

There has been known a steering control device configured to perform a steering control so that a vehicle is to travel in a traffic lane during traveling (for example, refer to PTL 1).

CITATION LIST

Patent Literature

PTL 1: JP-A-2002-337714

SUMMARY OF INVENTION

Technical Problem

In a large-sized vehicle capable of loading a cargo, motion performance of the vehicle changes, depending on a loading status of the cargo. However, the steering control device of the related art does not perform the steering control, considering the change in motion performance of the vehicle. Therefore, there is a concern that behaviors become unstable, depending on the loading status of the cargo.

The present disclosure has been made in view of the above situations, and an object thereof is to provide a steering control device and a steering control method capable of causing a vehicle to stably travel even though a loading status of a cargo in the vehicle changes.

Solution to Problem

A steering control device according to a first aspect of the present disclosure is a steering control device comprising: a first specifying unit configured to specify an expected travel position where a vehicle is expected to travel in a traffic lane in which the vehicle is to travel; a second specifying unit configured to specify information about a weight of the vehicle; an adjustment unit configured to adjust the expected travel position in a vehicle width direction, based on the expected travel position of the vehicle and the information about the weight; and a steering control unit configured to perform a steering control, based on the adjusted expected travel position.

The second specifying unit may be configured to specify, as the information about the weight, a weight of the vehicle and a weight of a cargo that is loaded in the vehicle.

The second specifying unit may be configured to specify, as the information about the weight, a position of the center of gravity of the vehicle.

The second specifying unit may be configured to specify, as the information about the weight, a height of the center of gravity of the vehicle.

The first specifying unit may be configured to specify a plurality of the expected travel positions in a traveling direction of the vehicle, and the adjustment unit may be configured to, in a case a line passing the plurality of the expected travel positions is a curved line, when it is determined that the vehicle is unable to travel safely based on the information about the weight and at least one of the plurality of the expected travel positions, adjust at least one of the plurality of the expected travel positions such that a radius of curvature of the curved line is to increase.

The adjustment unit may be configured to: determine whether the vehicle is traveling along the curved line, based on the plurality of the expected travel positions; when it is determined that the vehicle is traveling along the curved line, calculate a radius of curvature of the curved line passing the plurality of the expected travel positions based on at least one of the plurality of the expected travel positions; and determine whether the vehicle is able to travel safely along the curved line, based on at least one of the calculated radius of curvature, the information about the weight, and a speed of the vehicle.

A steering control method according to a second aspect of the present disclosure is a steering control method configured to be executed by a computer, the method comprising: a step of specifying an expected travel position where a vehicle is expected to travel in a traffic lane in which the vehicle is to travel; a step of specifying information about a weight of the vehicle; a step of adjusting the expected travel position in a vehicle width direction, based on the expected travel position of the vehicle and the information about the weight; and a step of performing a steering control of the vehicle, based on the adjusted expected travel position.

A computer-readable storage medium according to a third aspect of the present disclosure is a computer-readable storage medium storing a computer program readable by a computer of a vehicle, the computer program, when executed by the computer, causes the vehicle to perform: a step of specifying an expected travel position where a vehicle is expected to travel in a traffic lane in which the vehicle is to travel; a step of specifying information about a weight of the vehicle; a step of adjusting the expected travel position in a vehicle width direction, based on the expected travel position of the vehicle and the information about the weight; and a step of performing a steering control, based on the adjusted expected travel position.

Advantageous Effects of Invention

According to the present disclosure, it is possible to cause the vehicle to stably travel even though a loading status of a cargo in the vehicle changes.

DESCRIPTION OF EMBODIMENTS

[Outline of Steering Control Device 10]

Figure 1A:
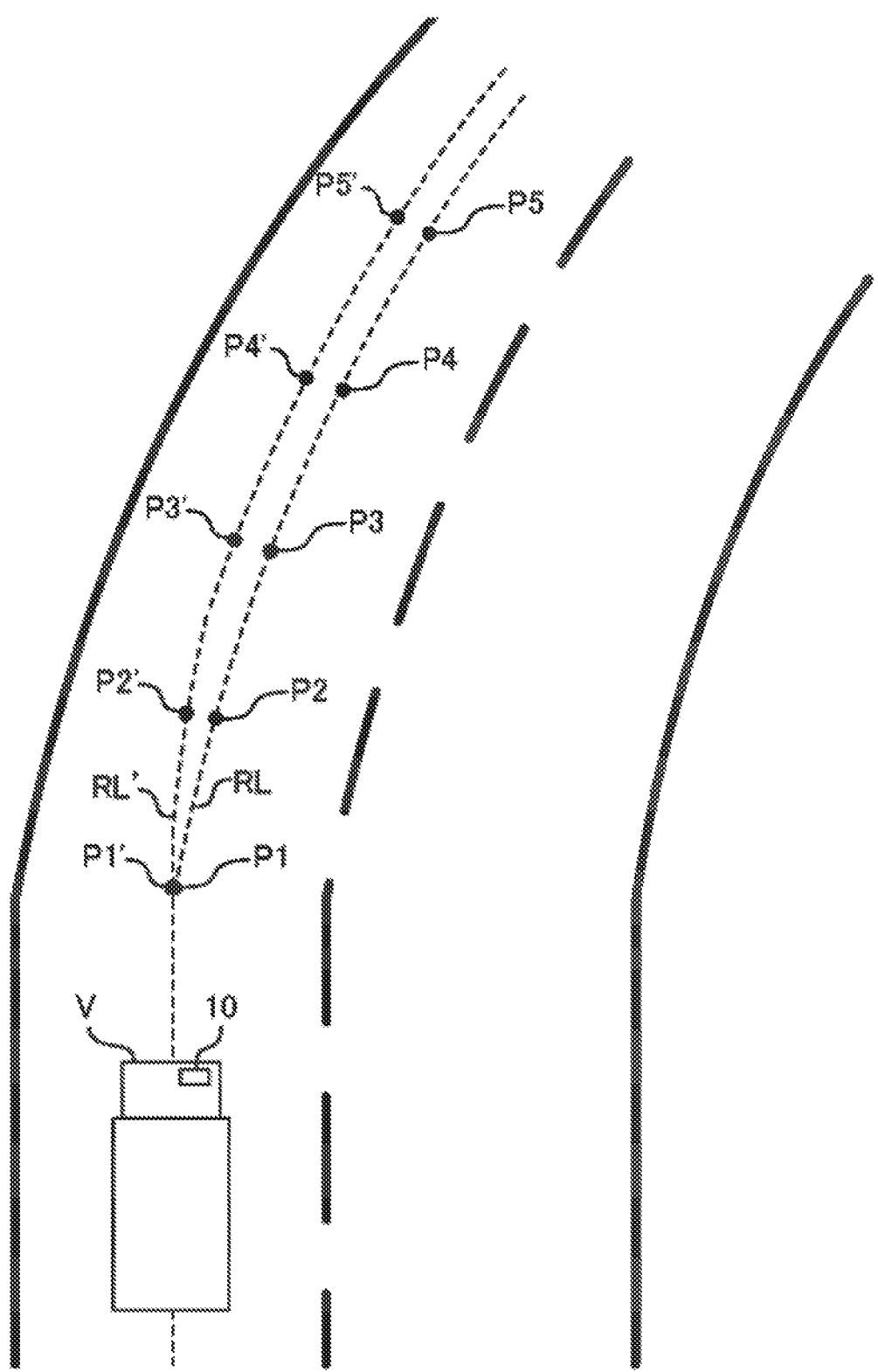
FIG. 1A illustrates an outline of a steering control device in accordance with the present embodiment, showing a travel line of a vehicle V.
Figure 1B:
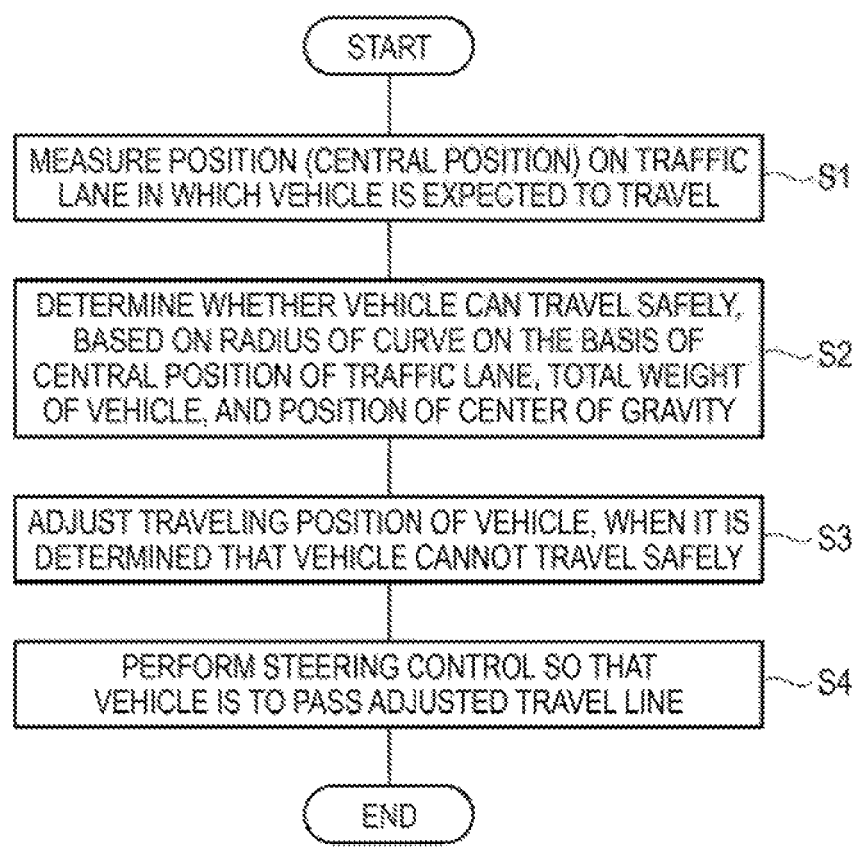
FIG. 1B illustrates the outline of the steering control device in accordance with the present embodiment, showing a flowchart of a steering control.

FIGS. 1A and 1B illustrate an outline of a steering control device 10 in accordance with the present embodiment. The steering control device 10 is a device for controlling steering of a large-sized vehicle V such as a bus, a truck and the like, for example. The steering control device 10 specifies a central position of a traffic lane in a horizontal direction, as a plurality of expected travel positions P1 to P5 on the traffic lane in which the vehicle V is expected to travel (S1 in FIG. 1B). The steering control device 10 specifies a line passing the plurality of specified expected travel positions P1 to P5, as a travel line RL of the vehicle V (refer to FIG. 1A).

When the travel line RL forms a curve, the steering control device 10 determines whether the vehicle V can travel safely, based on a radius of the curve indicated by the travel line RL, a total weight of the vehicle V, and a position of the center of gravity of the vehicle V (S2 in FIG. 1B). When it is not determined that the vehicle V can travel safely, the steering control device 10 adjusts the expected travel positions P1 to P5 so that the radius of the curve indicated by the travel line RL is to increase (S3 in FIG. 1B). In the example of FIG. 1A, the steering control device 10 adjusts the expected travel positions to P1' to P5'.

The steering control device 10 specifies a line passing the adjusted expected travel positions P1' to P5', as a travel line RL', and performs the steering control so that the vehicle V passes the adjusted travel line RL' (S4 in FIG. 1B). In this way, even though a loading status of a cargo in the vehicle V changes, the steering control device 10 can cause the vehicle V to stably travel.

Subsequently, a configuration of the steering control device 10 is described.

[Configuration of Steering Control Device 10]

Figure 2:
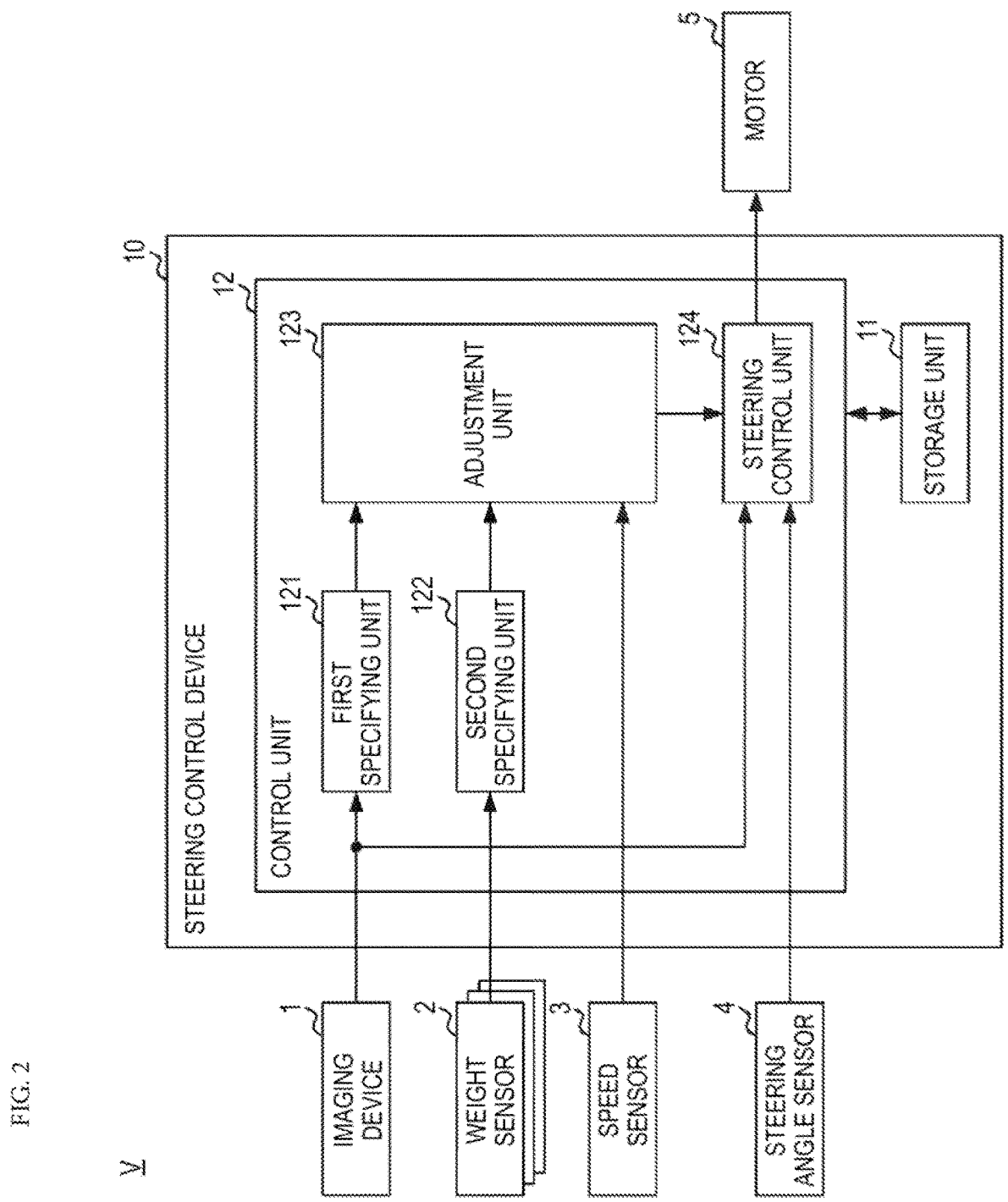
FIG. 2 depicts a configuration example of the steering control device in accordance with the present embodiment.

FIG. 2 depicts a configuration example of the steering control device 10 in accordance with the present embodiment.

As shown in FIG. 2, the steering control device 10 is electrically connected to an imaging device 1, weight sensors 2, a speed sensor 3, a steering angle sensor 4, and a motor 5, which are provided to the vehicle V.

The imaging device 1 is configured to capture a situation in front of the vehicle V in a traveling direction, including a traffic lane in which the vehicle V is traveling, at predetermined time intervals (for example, 10 milliseconds). The imaging device 1 is configured to output the captured image to the steering control device 10.

The weight sensors 2 are provided in the vicinity of a plurality of air suspensions (not shown) provided to the vehicle V, for example, and are configured to detect weights that are applied to the air suspensions, respectively. The weight sensors 2 are each configured to output weight information indicative of the detected weight to the steering control device 10. Here, the weight sensor 2 may be configured to detect the weight, based on an amount of air that is supplied to the air suspension.

The speed sensor 3 is configured to detect a speed of the vehicle V. The speed sensor 3 is configured to output speed information indicative of the speed of the vehicle V to the steering control device 10.

The steering angle sensor 4 is provided to a steering shaft (not shown) of the vehicle V, for example, and is configured to detect a steering angle of a steering wheel (not shown) connected to the steering shaft. The steering angle sensor 4 is configured to output steering angle information indicative of an absolute value of the detected steering angle and a steering direction to the steering control device 10.

The motor 5 is provided to the steering shaft (not shown) of the vehicle V. The motor 5 is rotatively driven by power that is fed from the steering control device 10, thereby applying torque to the steering shaft to perform a steering operation. The motor 5 functions as a steering assisting unit configured to perform steering assistance for the vehicle V to travel along a travel traffic lane.

The steering control device 10 includes a storage unit 11, and a control unit 12.

The storage unit 11 is, for example, a ROM (Read Only Memory) a RAM (Random Access Memory) or a hard disk drive. The storage unit 11 stores a variety of programs for causing the control unit 12 to function. The storage unit 11 stores a steering control program for causing the control unit 12 to function as a first specifying unit 121, a second specifying unit 122, an adjustment unit 123, and a steering control unit 124.

Also, the storage unit 11 stores vehicle weight information that indicates a weight of the vehicle V when no cargo is loaded in the vehicle V.

The control unit 12 is, for example, a CPU (Central Processing Unit). The control unit 12 is configured to function as the first specifying unit 121, the second specifying unit 122, the adjustment unit 123, and the steering control unit 124 by executing the steering control program stored in the storage unit 11.

In descriptions below, for explanatory convenience, in an image captured by the imaging device 1, a direction facing toward a traveling direction of the vehicle V is referred to as 'Y-axis', and a direction indicating a vehicle width direction of the vehicle V and perpendicular to the Y-axis is referred to as 'X-axis'.

The first specifying unit 121 is configured to specify a plurality of expected travel positions where the vehicle V is expected to travel in the traffic lane in which the vehicle V travels. Specifically, the first specifying unit 121 is configured to analyze the captured image output from the imaging device 1, and to specify demarcation lines indicative of a left end and a right end of the traffic lane in which the vehicle V travels. The first specifying unit 121 is configured to equally divide the captured image in the Y-axis direction that is a traveling direction of the vehicle, and to specify X coordinates that are coordinates in the vehicle width direction at each of Y coordinates corresponding to the equally divided positions. The first specifying unit 121 is configured to specify X coordinates corresponding to the demarcation line indicative of the left end of the traffic lane in which the vehicle V travels, and the demarcation line indicative of the right end.

The first specifying unit 121 is configured to specify, as a central position of the traffic lane, a central position between the X coordinate, which indicates a position of the demarcation line indicative of the left end of the traffic lane in which the vehicle V travels, at each of the Y coordinates corresponding to the equally divided position, and the X coordinate, which indicates a position of the demarcation line indicative of the right end. The first specifying unit 121 is configured to specify, as the expected travel position, the central position of the traffic lane specified at each of the Y coordinates.

The second specifying unit 122 is configured to specify information about a weight of the vehicle V. Specifically, the second specifying unit 122 is configured to specify a weight of a cargo loaded in the vehicle V, based on the weight indicated by the weight information obtained from the plurality of weight sensors 2. Also, the second specifying unit 122 is configured to specify a weight of the vehicle V, based on the vehicle weight information stored in advance in the storage unit 11.

Also, the second specifying unit 122 is configured to specify, as the information about the weight, a position of the center of gravity of the vehicle V. Specifically, the second specifying unit 122 is configured to specify a position of the center of gravity in the vehicle width direction (X-axis direction) of the vehicle V and a position of the center of gravity in the traveling direction (Y-axis direction) of the vehicle V, based on deviation of the weight indicated by the weight information obtained from the plurality of weight sensors 2, and positions of the plurality of weight sensors 2.

Also, the second specifying unit 122 is configured to specify, as the information about the weight, a height of the center of gravity of the vehicle V. For example, information about the height of the center of gravity in which a weight of a cargo and a height of the center of gravity of the vehicle V are associated with each other is stored in the storage unit 11. The second specifying unit 122 is configured to refer to the information about the height of the center of gravity stored in the storage unit 11, and to specify the height of the center of gravity associated with a weight indicated by the weight information obtained from the plurality of weight sensors 2, thereby specifying the height of the center of gravity of the vehicle V.

The adjustment unit 123 is configured to adjust the expected travel positions specified by the first specifying unit 121 in the vehicle width direction of the vehicle V, based on the expected travel positions of the vehicle V and the information about the weight. Specifically, first, the adjustment unit 123 is configured to determine whether a line passing the plurality of expected travel positions specified by the first specifying unit 121 is a curved line or not. When it is determined that a line passing the plurality of expected travel positions specified by the first specifying unit 121 is a curved line, the adjustment unit 123 determines whether the vehicle V can travel safely, based on the information about the weight and at least one of the plurality of expected travel positions.

More specifically, the adjustment unit 123 is configured to calculate a radius of curvature of the curved line passing the plurality of expected travel positions, based on at least one of the plurality of expected travel positions. The adjustment unit 123 is configured to determine whether the vehicle V can travel safely, based on the calculated radius of curvature, the weight of the vehicle, the weight of the cargo, the position of the center of gravity and the height of the center of gravity, which are the information about the weight specified by the second specifying unit 122, and the speed of the vehicle V indicated by the speed information output from the speed sensor 3.

For example, the adjustment unit 123 calculates a centrifugal force that is applied to the vehicle V, based on the calculated radius of curvature, the weight of the vehicle, the weight of the cargo and the position of the center of gravity, which are the information about the weight specified by the second specifying unit 122, and the speed of the vehicle V. Then, the adjustment unit 123 calculates moment that is horizontally applied to the vehicle V, based on the calculated centrifugal force and the height of the center of gravity.

When the calculated moment is equal to or less than a preset threshold value, the adjustment unit 123 determines that the vehicle V can travel safely, and when the calculated moment is greater than the threshold value, the adjustment unit 123 determines that the vehicle V is unable to travel safely.

When it is determined that the vehicle V is unable to travel safely, the adjustment unit 123 adjusts at least one of the plurality of expected travel positions so that the radius of curvature of the curved line is to increase. For example, the adjustment unit 123 specifies a width of the traffic lane in which the vehicle V travels, based on the coordinates corresponding to the demarcation lines of the traffic lane that were calculated so as to specify the expected travel positions by the first specifying unit 121. The adjustment unit 123 calculates an amount by which the vehicle V can move in the vehicle width direction, based on the specified width of the traffic lane and the width of the vehicle V. Then, the adjustment unit 123 adjusts the plurality of expected travel positions by adding the calculated movable amount to each of the X coordinates indicative of the plurality of expected travel positions in an opposite direction to a direction in which the vehicle V turns.

Here, the adjustment unit 123 may set a small amount of adjustment for an expected travel position, which is close to the vehicle V, of the plurality of expected travel positions. In this way, the vehicle V can smoothly move the adjusted expected travel positions. Also, the adjustment unit 123 may change the amounts of adjustment of the plurality of expected travel positions, based on a magnitude of the calculated moment. For example, when the calculated moment is close to a preset threshold value, the adjustment unit 123 may set a small amount of adjustment, and when the calculated moment largely exceeds the threshold value, the adjustment unit 123 may set a large amount of adjustment.

In the above, the adjustment unit 123 adds the calculated movable amount to each of the X coordinates indicative of the plurality of expected travel positions in the opposite direction to the direction in which the vehicle V turns. However, the present disclosure is not limited thereto. The adjustment unit 123 may add the calculated movable amount to each of X coordinates indicative of a plurality of expected travel positions, which corresponds to vicinities of a beginning and an end of the curved line, of the plurality of expected travel positions in the opposite direction to the direction in which the vehicle V turns, and add the calculated movable amount to each of X coordinates indicative of a plurality of expected travel positions corresponding to vicinities of an intermediate part of the curved line in the direction in which the vehicle V turns. In this way, the curved line passing the adjusted expected travel positions becomes a travel line on which the vehicle travels in an out-in-out manner in the traffic lane. Therefore, the steering control device 10 can increase the radius of curvature of the curved line.

The steering control unit 124 is configured to perform a steering control of the vehicle V by controlling the motor 5 based on the expected travel positions adjusted by the adjustment unit 123. Specifically, the steering control unit 124 is configured to analyze the captured image captured by the imaging device 1 and to specify a position of the vehicle V in the traffic lane. Then, the steering control unit 124 is configured to feed power to the motor 5 so that the vehicle V is to travel along the plurality of adjusted expected travel positions, based on the position of the vehicle V in the traffic lane, the plurality of adjusted expected travel positions, and the steering angle output from the steering angle sensor 4.

[Flow of Processing that is Executed in Steering Control Device 10]

Figure 3:
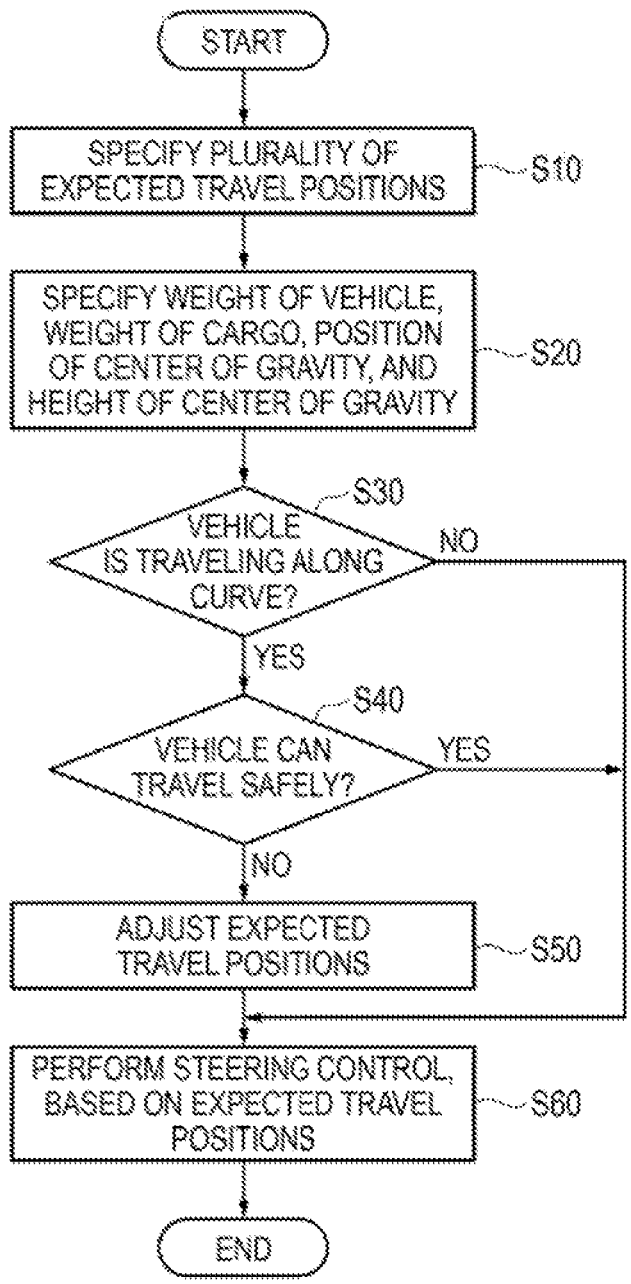
FIG. 3 is a flowchart showing a flow of processing that is executed in the steering control device in accordance with the present embodiment.

Subsequently, a flow of processing that is executed in the steering control device 10 is described. FIG. 3 is a flowchart showing a flow of processing that is executed in the steering control device 10.

First, the first specifying unit 121 specifies a plurality of expected travel positions where the vehicle V is expected to travel in the traffic lane in which the vehicle V travels (S10).

Then, the second specifying unit 122 specifies, as the information about the weight, a weight of the vehicle V, a weight of a cargo, a position of the center of gravity, and a height of the center of gravity (S20).

Subsequently, the adjustment unit 123 determines whether the vehicle V is traveling along a curved line, based on the plurality of expected travel positions (S30). When it is determined that the vehicle V is traveling along a curved line, the adjustment unit 123 proceeds to S40, and when it is determined that the vehicle V is not traveling along a curved line, the adjustment unit 123 proceeds to S60.

Subsequently, the adjustment unit 123 determines whether the vehicle V can travel safely along a curved line indicated by the plurality of expected travel positions, based on the information about the weight and at least one of the plurality of expected travel positions (S40). When it is determined that the vehicle V can travel safely, the adjustment unit 123 proceeds to S60, and when it is determined that the vehicle V is unable to travel safely, the adjustment unit 123 proceeds to S50.

Subsequently, the adjustment unit 123 adjusts at least one of the plurality of expected travel positions so that a radius of curvature of the curved line is to increase (S50).

Subsequently, the steering control unit 124 performs the steering control, based on the expected travel positions (S60). Specifically, when it is determined that the vehicle V is unable to travel safely along the curved line indicated by the plurality of expected travel positions, the steering control unit 124 performs the steering control so that the vehicle V is to travel along the expected travel positions adjusted by the adjustment unit 123. Also, when the plurality of expected travel positions does not indicate a curved line or when it is determined that the vehicle V can travel safely along the curved line indicated by the plurality of expected travel positions, the steering control unit 124 performs the steering control so that the vehicle V is to travel along the expected travel positions specified by the first specifying unit 121.

Effects of Present Embodiment

As described above, the steering control device 10 in accordance with the present embodiment includes the first specifying unit 121 configured to specify the expected travel positions where the vehicle V is expected to travel in the traffic lane in which the vehicle V travels, the second specifying unit 122 configured to specify the information about the weight of the vehicle V, the adjustment unit 123 configured to adjust the expected travel positions in the vehicle width direction, based on the expected travel positions of the vehicle V and the information about the weight, and the steering control unit 124 configured to perform the steering control, based on the adjusted expected travel positions. Thereby, the steering control device 10 can cause the vehicle V to stably travel even though a loading status of the cargo in the vehicle V changes.

Also, when it is determined that the vehicle V is unable to travel safely, based on the weight of the cargo loaded in the vehicle V, and the position of the center of gravity and the height of the center of gravity of the vehicle V, which change depending on the loading status of the cargo, the steering control device 10 can adjust the expected travel positions. Therefore, the steering control device 10 can adjust the expected travel positions, based on the status of the cargo, and cause the vehicle V to travel stably.

Although the present disclosure has been described with reference to the embodiment, the technical scope of the present disclosure is not limited to that described in the embodiment, and various modifications and changes can be made within the scope of the description. Also, for example, the specific embodiments of separated or integrated devices are not limited to the above embodiment, and all or a part thereof can be configured to be functionally or physically separated or integrated in any desired units.

The subject application is based on Japanese Patent Application No. 2017-213552 filed on Nov. 6, 2017, the contents of which are incorporated herein by reference.

INDUSTRIAL APPLICABILITY

The present disclosure achieves the effect of causing the vehicle to stably travel even though the loading status of the cargo in the vehicle changes, and is useful for the steering control device, the steering control method and the like.

DESCRIPTION OF REFERENCE SIGNS

1 . . . Imaging device
2 . . . Weight sensor
3 . . . Speed sensor
4 . . . Steering angle sensor
5 . . . Motor
10 . . . Steering control device
11 . . . Storage unit
12 . . . Control unit
121 . . . First specifying unit
122 . . . Second specifying unit
123 . . . Adjustment unit
124 . . . Steering control unit
V . . . Vehicle

The invention claimed is:

1. A steering control device comprising:
a controller configured to:
specify a plurality of expected travel positions where a vehicle is expected to travel in a traffic lane in which the vehicle is to travel, the plurality of the expected travel positions indicating a plurality of positions in vehicle width directions corresponding to a traveling direction of the vehicle;
specify information about a weight of the vehicle;
in a case a line passing the plurality of the expected travel positions is a curved line, when it is determined that the vehicle is unable to travel safely based on the plurality of the expected travel positions and the information about the weight, by adjusting the expected travel positions corresponding to vicinities of a beginning and an end of the curved line of the plurality of expected travel positions to positions in directions opposite to a direction in which the curved line turns and by adjusting the expected travel positions corresponding to vicinities of an intermediate part of the curved line to positions in the direction in which the curved line turns, adjust the plurality of the expected travel positions so that a radius of curvature of the curved line is to increase; and perform a steering control of the vehicle, based on the plurality of the adjusted expected travel positions.

2. The steering control device according to claim 1, wherein, in the specifying of the information, the controller is configured to specify, as the information about the weight, a weight of the vehicle and a weight of a cargo that is loaded in the vehicle.

3. The steering control device according to claim 1, wherein, in the specifying of the information, the controller is configured to specify, as the information about the weight, a position of a center of gravity of the vehicle.

4. The steering control device according to claim 1, wherein, in the specifying of the information, the controller is configured to specify, as the information about the weight, a height of a center of gravity of the vehicle.

5. The steering control device according to claim 4, wherein, in the adjusting of the expected travel position, the controller is configured to:
- determine whether the vehicle is traveling along the curved line, based on the plurality of the expected travel positions;
- when it is determined that the vehicle is traveling along the curved line, calculate the radius of curvature of the curved line passing the plurality of the expected travel positions based on at least one of the plurality of the expected travel positions; and
- determine whether the vehicle is able to travel safely along the curved line, based on at least one of the calculated radius of curvature, the information about the weight, and a speed of the vehicle.

6. A steering control method executable by a computer, the method comprising:
- specifying a plurality of expected travel positions where a vehicle is expected to travel in a traffic lane in which the vehicle is to travel, the plurality of the expected travel positions indicating a plurality of positions in vehicle width directions corresponding to a traveling direction of the vehicle;
- specifying information about a weight of the vehicle;
- in a case a line passing the plurality of the expected travel positions is a curved line, when it is determined that the vehicle is unable to travel safely based on the plurality of the expected travel positions and the information about the weight, by adjusting the expected travel positions corresponding to vicinities of a beginning and an end of the curved line of the plurality of expected travel positions to positions in directions opposite to a direction in which the curved line turns and by adjusting the expected travel positions corresponding to vicinities of an intermediate part of the curved line to positions in the direction in which the curved line turns, adjusting the plurality of the expected travel positions so that a radius of curvature of the curved line is to increase; and
- performing a steering control of the vehicle, based on the plurality of the adjusted expected travel positions.

7. A non-transitory computer-readable storage medium storing a computer program readable by a computer of a vehicle, the computer program, when executed by the computer, causes the vehicle to perform:
- specifying a plurality of expected travel positions where a vehicle is expected to travel in a traffic lane in which the vehicle is to travel, the plurality of the expected travel positions indicating a plurality of positions in vehicle width directions corresponding to a traveling direction of the vehicle;
- specifying information about a weight of the vehicle;
- in a case a line passing the plurality of the expected travel positions is a curved line, when it is determined that the vehicle is unable to travel safely based on the plurality of the expected travel positions and the information about the weight, by adjusting the expected travel positions corresponding to vicinities of a beginning and an end of the curved line of the plurality of expected travel positions to positions in directions opposite to a direction in which the curved line turns and by adjusting the expected travel positions corresponding to vicinities of an intermediate part of the curved line to positions in the direction in which the curved line turns, adjusting the plurality of the expected travel positions so that a radius of curvature of the curved line is to increase; and
- performing a steering control of the vehicle, based on the plurality of the adjusted expected travel position.

* * * * *